United States Patent
Lamb et al.

(10) Patent No.: US 12,191,625 B2
(45) Date of Patent: Jan. 7, 2025

(54) LASER

(71) Applicant: Leonardo MW Ltd, Essex (GB)

(72) Inventors: Robert Lamb, Essex (GB); Ian Elder, Essex (GB)

(73) Assignee: LEONARDO UK LTD, London (GB)

( * ) Notice: Subject to any disclaimer, the term of this patent is extended or adjusted under 35 U.S.C. 154(b) by 803 days.

(21) Appl. No.: 16/978,245

(22) PCT Filed: Mar. 11, 2019

(86) PCT No.: PCT/EP2019/056063
§ 371 (c)(1),
(2) Date: Sep. 4, 2020

(87) PCT Pub. No.: WO2019/170922
PCT Pub. Date: Sep. 12, 2019

(65) Prior Publication Data
US 2021/0006030 A1    Jan. 7, 2021

(30) Foreign Application Priority Data

Mar. 9, 2018   (GB) .................................... 1803777

(51) Int. Cl.
*H01S 3/083*        (2006.01)
*G02B 27/10*        (2006.01)
*H01S 3/081*        (2006.01)

(52) U.S. Cl.
CPC .......... *H01S 3/083* (2013.01); *G02B 27/1006* (2013.01); *H01S 3/0813* (2013.01)

(58) Field of Classification Search
CPC .. H01S 3/083; H01S 3/08059; H01S 3/08063; H01S 3/08068; H01S 3/08072
See application file for complete search history.

(56) References Cited

U.S. PATENT DOCUMENTS

| 4,799,780 A | 1/1989 | Bernard et al. |
| 5,050,183 A | 9/1991 | Duling |

(Continued)

FOREIGN PATENT DOCUMENTS

| CN | 107221831 A | 9/2017 |
| JP | H03-046286 A | 2/1991 |

(Continued)

OTHER PUBLICATIONS https://www.edmundoptics.com/knowledge-center/application-notes/optics/introduction-to-adaptive-optics-and-deformable-mirrors/?gclid=CjwKCAjw9pGjBhB-EiwAa5j13LYcdbxhn_IYrtmYx3iyOmnPSoOWJH-ftIEKxLaghrDuYODAm1RceRoCOoIQAvD_BwE (Year: 2023).*

(Continued)

*Primary Examiner* — Minsun O Harvey
*Assistant Examiner* — Stephen Sutton Kotter
(74) *Attorney, Agent, or Firm* — Buchanan Ingersoll & Rooney PC

(57) ABSTRACT

A laser system having an optical ring resonator, a beam splitter that directs a first beam travelling in a first direction around the ring resonator, out of the resonator towards a reflector that reflects the first beam back into the resonator to travel in an opposite direction around the optical ring resonator that is in the same direction as a second beam travelling around the optical ring resonator; and a beam modifier configured and adapted to modify a spatial distribution of phase across an aperture of the first beam such as to cause it to become more similar or substantially match that of a spatial distribution of phase across an aperture of the second beam.

16 Claims, 3 Drawing Sheets

(56) References Cited

U.S. PATENT DOCUMENTS

Figure 1:
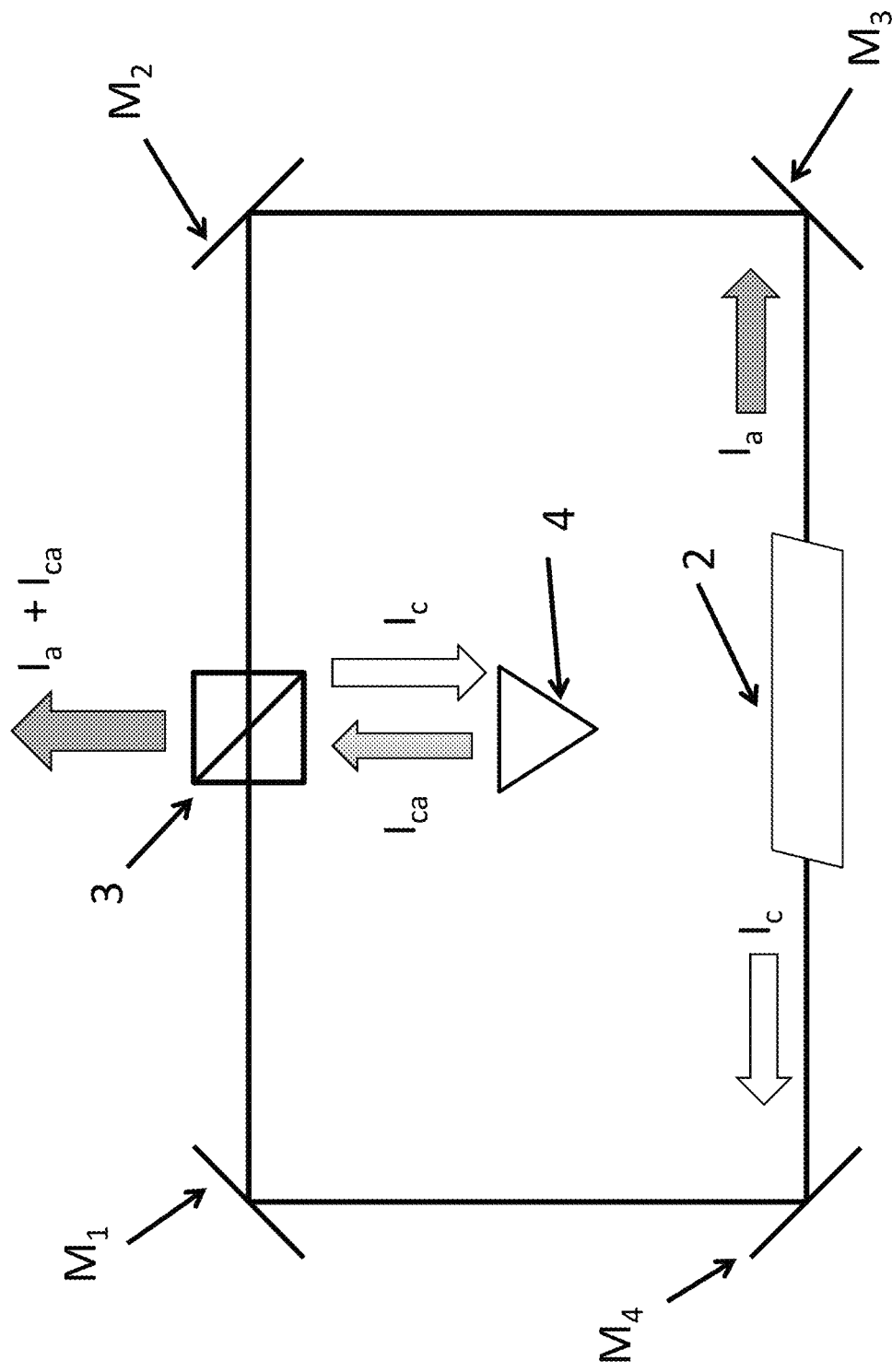

| 5,408,492 | A | | 4/1995 | Vossler et al. | |
|---|---|---|---|---|---|
| 6,034,770 | A | | 3/2000 | Kim et al. | |
| 7,289,548 | B2 | | 10/2007 | Ishizu | |
| 7,532,657 | B2 | | 5/2009 | Ishizu | |
| 9,385,508 | B2 | * | 7/2016 | Pai | H01S 5/141 |
| 9,502,854 | B1 | * | 11/2016 | Filgas | H01S 3/083 |
| 2005/0094256 | A1 | | 5/2005 | Dane et al. | |
| 2006/0114962 | A1 | | 6/2006 | Ishizu | |
| 2008/0013588 | A1 | | 1/2008 | Ishizu | |
| 2018/0138651 | A1 | * | 5/2018 | Yuan | H01S 3/235 |
| 2021/0294109 | A1 | * | 9/2021 | Golubchik | H01S 3/067 |

FOREIGN PATENT DOCUMENTS

| JP | H10-215018 A | 8/1998 |
|---|---|---|
| JP | 2006-156782 A | 6/2006 |
| WO | 2007/123781 A1 | 11/2007 |

OTHER PUBLICATIONS

International Search Report (PCT/ISA/210) issued on May 21, 2019, by the European Patent Office as the International Searching Authority for International Application No. PCT/EP2019/056063.

Written Opinion (PCT/ISA/237) issued on May 21, 2019, by the European Patent Office as the International Searching Authority for International Application No. PCT/EP2019/056063.

Office Action (Examination Report No. 1) issued on Feb. 6, 2023, by the Australian Patent Office in corresponding Australian Patent Application No. 2022200906. (4 pages).

First Office Action issued on Jul. 5, 2022, by the Japanese Patent Office in corresponding Japanese Patent Application No. 2020-570647, and an English Translation of the Office Action. (5 pages).

Office Action (Notification of Reason for Refusal) issued Jul. 8, 2021, by the Korean Intellectual Property Office in corresponding Korean Patent Application No. 10-2020-7025017 and an English Translation of the Office Action. (17 pages).

Office Action (Examination report No. 2 for standard patent application) issued Aug. 31, 2021, by the Patent Office, Australian Government, in corresponding Australian Patent Application No. 2019232250. (6 pages).

International Preliminary Report on Patentability and Written Opinion of the International Searching Authority (Forms PCT/IB/373 and PCT/ISA/237) issued on Sep. 15, 2020, by the International Bureau of WIPO, in corresponding International Application No. PCT/EP2019/056063. (7 pages).

Office Action issued on Sep. 27, 2021, by the Canadian Patent Office in corresponding Canadian Patent Application No. 3,093,369. (4 pages).

First Office Action issued on Oct. 5, 2021, by the Japanese Patent Office in corresponding Japanese Patent Application No. 2020-570647, and an English Translation of the Office Action. (8 pages).

* cited by examiner

LASER

The present invention relates to a laser having a laser ring resonator.

A beam propagating in a laser resonator exhibits spatial modes which are characteristic of the geometry of the resonator. A mode defines a particular spatial distribution of intensity and phase across the beam aperture which repeats itself (i.e. is reproduced) after each round trip in a resonator maintaining both shape and size in any plane orthogonal to the beam axis. Usually the laser is configured to preferentially adopt only the lowest spatial mode which often has a Gaussian cross-section. This has the lowest divergence of intensity and is therefore the most useful for many applications where the beam power is directed to a distant object (as in remote sensing) or focussed (as in industrial processing). In practice, thermally induced aberrations within the laser gain medium cause the mode quality (uniformity of intensity and phase distribution) to deteriorate. A phase plate can be used to correct the distortions of the phase front and so improve the beam quality.

In a ring resonator the laser beam propagation is often bi-directional; i.e. two distinct beams are formed which propagate in respective clockwise and anti-clockwise directions. As each of the beams have only up to half of the total power available, without mitigation, this leads to a reduction in the useful output of the ring resonator.

It is well known that the laser resonator can be configured such that beam propagation is "unstable". This means that the beam changes after each round trip and can expand or contract: its shape or size is therefore not reproduced. The losses in one direction (e.g. clockwise) are greater than in the opposite direction (i.e. anti-clockwise) and the resonator will favour the mode which suffers the lowest loss. An unstable resonator can be formed by, for example, inserting a magnifying optic in the resonator such that the beam undergoes expansion (magnification) in one direction and contraction (demagnification) in the other. Uni-directional propagation can then occur because the dissimilar beam volumes result in one beam experiencing greater amplification than the other.

However, in some ring resonator designs (for example those where a simple optical design and compactness are essential) the use of magnifying optics is not favoured because this complicates the design leading to increased manufacturing costs.

A solution is to redirect one of the beams so that both beams propagate in the same direction. This allows both beams to be coupled out of the resonator in the same direction to make full use of the available power.

An example of the simplest design of laser in which this method is implemented is illustrated in FIG. 1. The laser has rectangular ring resonator constructed using four flat mirrors ($M_1$, $M_2$, $M_3$ and $M_4$), a laser gain medium (for example Nd:YAG) 2 a polarising beam splitter (PBS) 3 and a corner cube retroreflector (CCRR) 4. When lasing, clockwise $I_c$ and anticlockwise $I_a$ travelling beams propagate from the gain medium.

The polarising beam splitter couples out the two beams: $I_a$ forms the useful output and $I_c$ is coupled back into the cavity by a corner cube retroreflector (CCRR) as an anticlockwise travelling, clockwise beam, $I_{c,a}$.

Because the ring resonator of FIG. 1 has a symmetrical design, e.g. no magnifying components, in principle the losses experienced by the two beams are equal and $I_a$ and $I_c$ are of equal power and have the same spatial distribution. However, in practice the laser gain medium, pumped by, for example, a laser diode, exhibits refractive index variations which cause it to act as a lens. Slight inhomogeneities in the pump power distribution, alignment, thermal conduction and cooling in the Nd:YAG result in a slight difference in optical power and a different spatial distribution between the two beams and therefore, in general, $I_a \neq I_c$.

As such $I_{ca}$ will also be typically different from $I_a$ and thus the phase distribution of the combined beam formed from $I_{ca}$ and $I_a$ will also not be spatially resonant with the resonator. The net effect is that the beam quality of the output is reduced compared to where $I_a$ were outputted alone, and the power extraction efficiency is suboptimal resulting in a reduction in beam brightness (measured as power per unit solid angle) or radiance (measured as power per unit area per unit solid angle).

US2005/094256 describes a laser in which light is caused to travel around a ring shaped optical path. However the loop of US205/094256 does not constitute a resonator as the path that the light travels does not form a closed loop.

In a first aspect of the invention there is provided a laser system comprising an optical ring resonator, the laser system comprising: a means for redirecting a first beam travelling in a first direction around the optical ring resonator so as to cause the first beam to travel in an opposite direction around the optical ring resonator that is in the same direction as a second beam travelling around the optical ring resonator; and a beam modifier adapted to modify the spatial distribution of the phase across the aperture of the first beam such as to cause it to become more similar or substantially match that of the spatial distribution of phase across the aperture of the second beam.

In another aspect there is provided a laser system comprising: an optical ring resonator; a gain medium arranged to output: a first beam that circulates around the optical ring resonator in a first direction; and a second beam that circulates around the optical ring resonator in a second direction, the second direction being opposite to the first direction means for redirecting the first beam so as to cause the first beam to travel in the second direction around the optical ring resonator; the means for redirecting comprising: means for coupling out at least a portion of the first beam from the optical ring resonator; means for coupling the at least a portion of the first beam back into the resonator such that it travels in second direction around the ring resonator and the system comprises: a beam modifier adapted to modify the spatial distribution of phase across the aperture of the at least a portion of the first beam coupled out of the optical ring resonator, such as to cause it to become more similar or substantially match that of the spatial distribution of phase across the aperture of the second beam.

In a further aspect there is provided a method of operating a laser comprising: an optical ring resonator; activating a gain medium in order to cause it to output: a first beam that circulates around the optical ring resonator in a first direction; and a second beam that circulates around the optical ring resonator in a second direction, the second direction being opposite to the first direction directing at least a portion of the first beam out from the optical ring resonator; reintroducing the at least a portion of the first beam back into the resonator such that it travels in the second direction around the ring resonator; and modifying the spatial distribution of phase across the aperture of the at least a portion of the first beam coupled out of the optical ring resonator, such as to cause it to become more similar or substantially match that of the spatial distribution of phase across the aperture of the second beam.

In another aspect of the invention there is provided a method of operating a laser comprising By matching the phase distribution of the first and second beams, the phase distribution of the resulting combined beam will be naturally resonant with the resonator and therefore losses associated with non resonance will be minimised.

The following applies to any of the aspects of the invention above.

The means (e.g. redirector apparatus) for redirecting the first beam may comprise a beam splitter that directs a portion of the first beam out of the resonator towards a reflector, such as for example a flat mirror or retroflector. The reflector may be arranged to reflect the portion of the first beam back towards the ring resonator, e.g. back to the beam splitter (or a different beam splitter) which reflects the portion of the first beam so that it travels in the same direction as the second beam.

The beam modifier may comprise a surface upon which the first beam is incident, the surface being profiled to modify the wave front of the first beam such that the spatial distribution of phase across the aperture of the first beam becomes more similar or substantially matches that of the spatial distribution of phase across the aperture of the second beam once reintroduced into the resonator. As such the beam modifier may be arranged in the optical path of the first beam towards the resonator following its reflection from the reflector.

In one arrangement the beam modifier may be transmissive to the first beam and positioned such that the beam passes through it. The beam modifier may comprise a body transmissive to the first beam that provides the surface, the surface profiled such that the body has a thickness that varies across the aperture of the first beam. The beam modifier may, for example, be arranged between the beam splitter and the reflector.

In certain arrangements the portion of the first beam may travel through the body of the beam modifier twice so as to incide (have incidence on) the surface twice. The surface therefore may be profiled such that the wavefront profile of the portion of the first beam following its incidence with the surface the second time is more similar or matches the wave profile of the second beam at the point the portion of the first beam re-enters the resonator.

In an alternative arrangement the surface of the beam modifier may be reflective and as such the function of the beam modifier may be provided by the reflector.

Rather that varying the wavefront using a profiled surface, the modifier may comprise a transmissive body having a refractive index that varies across the beam aperture.

As described above, the modifier may be static. Alternatively the surface of the modifier may be dynamically alterable during use in order to adjust the surface to account for changes in the aberration of the first beam over time—e.g. whilst the laser system is warming up. A dynamic surface may be provided, for example by a deformable surface, e.g. a flexible membrane or bimorph mirror such as those used in adaptive optics; a spatial light modulator; or using phase conjugation.

The beam splitter may also function to output a portion of the second beam and the re-directed first beam from the optical ring resonator.

The laser system may comprise a phase distortion rectifier adapted to rectify the wavefront of both the second beam and the redirected modified first beam to correct wave front aberration of said second beam and redirected modified first beam. By reducing aberrations the divergence of the beam is reduced, i.e. the beam becomes more collimated.

The wavefront distortion rectifier may be arranged to modify the wavefront of the second beam and redirected first beam following output of said beams from the optical ring resonator. Alternatively, the phase distortion rectifier may be arranged within the optical ring resonator.

The wavefront distortion rectifier may comprise a surface upon which the second beam and redirected modified first beam incide, the surface being profiled to rectify the wavefront of the combined beams.

In one arrangement the beam wave front distortion rectifier may be transmissive to the combined beams. The wavefront distortion rectifier may comprise a body transmissive to the combined beams that provides the surface, the surface profiled such that the body has a thickness that varies across the apertures of the combined beams. Wavefront distortion rectifiers of this type are often referred to as phase plates.

The laser system may comprise a Nd:YAG gain medium in order to provide an output laser with a wavelength of 1064 nm. Nevertheless, the invention can be applied to laser systems using other gain mediums to provide ouput beams with other wavelengths.

The ring resonator may be comprised from reflectors, e.g. flat mirrors and/or turning prisms arranged to cause beams to circulated around a closed optical path.

According to another aspect of the invention there is provided a laser system comprising an optical ring resonator and a wavefront distortion rectifier, the wavefront distortion rectifier adapted to modify a wavefront of an optical beam incident thereon to correct wavefront aberration of said optical beam. The laser system may be adapted to include the various optional features described in relation to the above described aspects of the invention.

Figure 2:
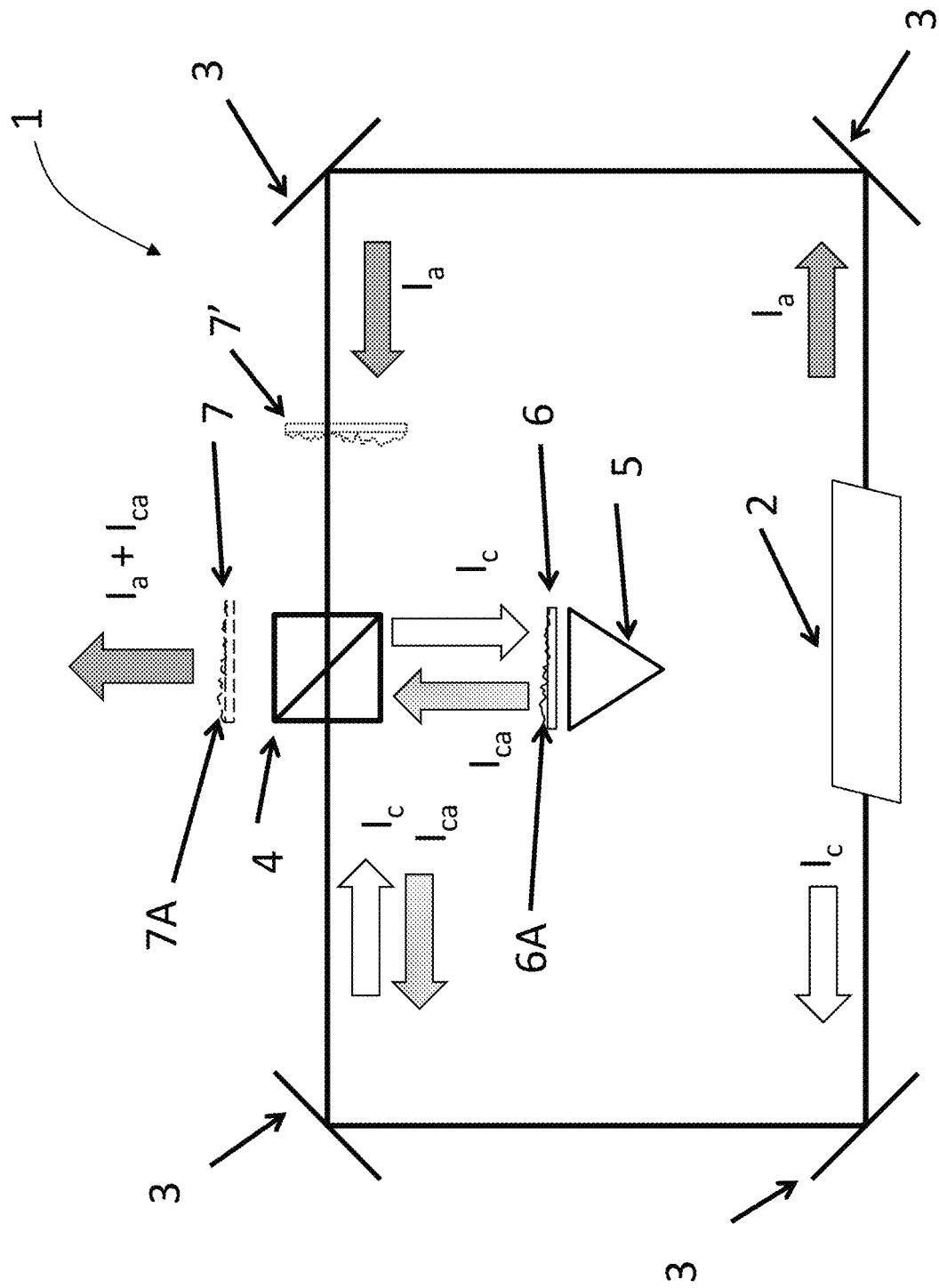
Figure 3:
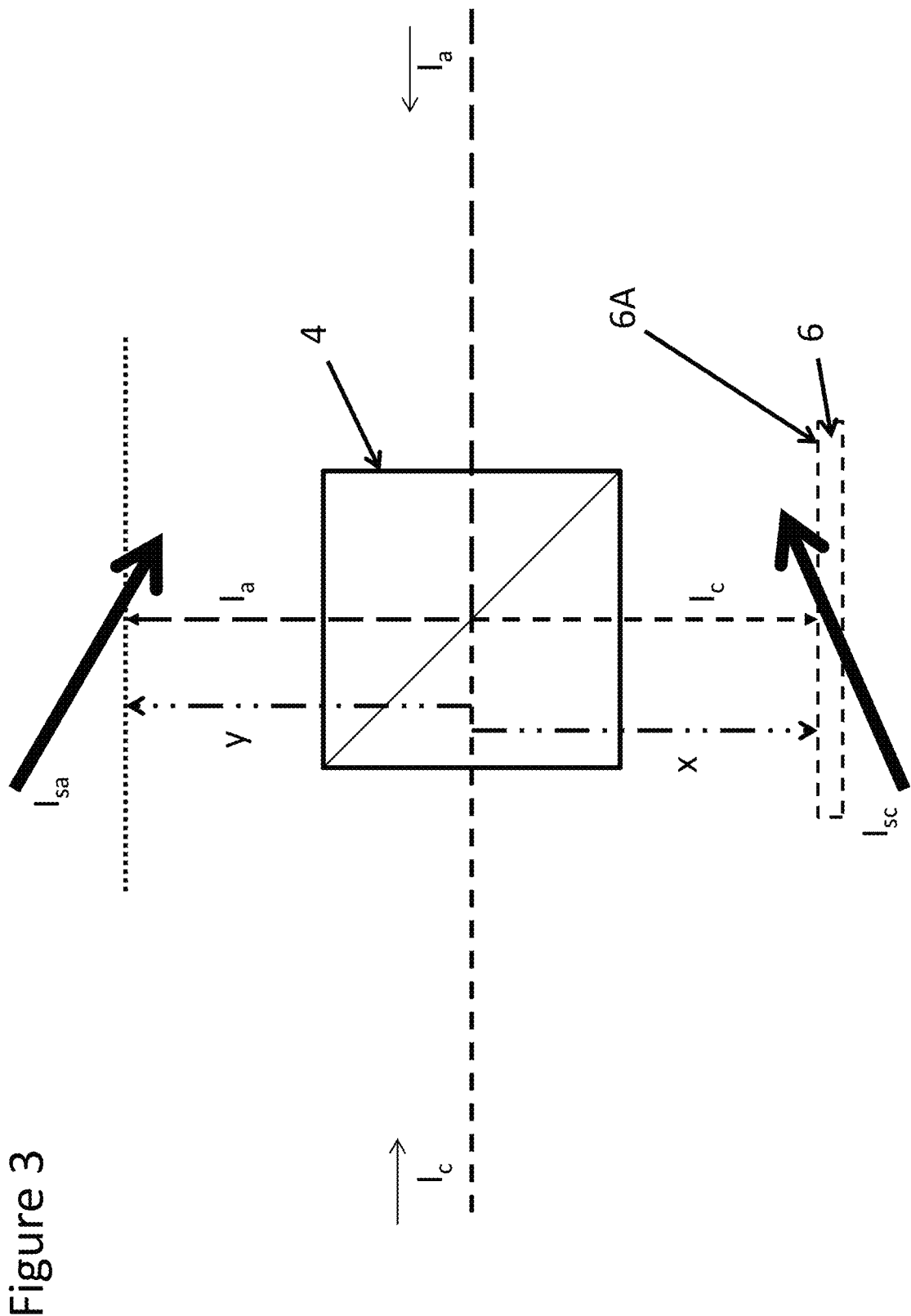

The invention will now be described by way of example with reference to the Figures in which FIG. 1 is a schematic of a prior art ring resonator;

FIG. 2 is a schematic of a ring resonator adapted to redirect one of the counter propagating beams and modify the wavefront of the redirected beam to substantially match that of the other beam; and FIG. 3 is a schematic illustration the measurement of the clockwise beam $I_c$ and anticlockwise beam $I_a$.

FIG. 2 illustrates a laser system 1 comprising a laser gain medium 2, in this example Nd:YAG, and reflectors 3, e.g. mirrors arranged to create a closed optical path to provide a ring resonator. In this case the optical path is rectangular though the shape is unimportant. The laser system 1 further includes a beam splitter 4, e.g. a partially reflective mirror or possibly a polarising beam splitter, arranged to lie in the optical path of the ring resonator, and a further reflector 5, in this example a corner cube retroreflector though a flat mirror could be used instead.

The laser gain medium 2 when activated by an external energy source (not shown) outputs counter propagating laser beams: a clockwise beam $I_c$ and anticlockwise beam $I_a$. For the reasons described in the introduction, there are likely to be differences in the phase profile (i.e. the phase profile in a plane perpendicular to the direction of propagation) of beam $I_a$ compared with beam $I_c$.

The beam splitter 4 couples out a portion of $I_c$ from the resonator towards a further reflector 5. The further reflector 5, which in this example is a corner cube retroreflector though could be a flat mirror, reflects the portion of $I_c$ back to the beamsplitter 4 which couples $I_c$ back into the resonator so as to travel in the anticlockwise direction. Between being coupled out and back into the resonator, the wavefront of $I_c$ is modified by a beam modifier 6. The anticlockwise travelling modified clockwise beam $I_c$ is shown in FIG. 2 as $I_{ca}$.

The beamsplitter 4 also functions to couple out from the resonator the combined beam of $I_a$ and $I_{ca}$ to provide the used output of the laser system 1.

The beam modifier 6 is positioned in the optical path between the beam splitter 4 and the further reflector 5. The beam modifier 6 comprises a body that is transmissive to beam $I_c$ and the beam modifier 6, beam splitter 4 and further reflector 5 arranged such that beam $I_c$ passes through the body twice, once towards the further reflector 5 and again on its return towards the beam splitter 4.

The body (e.g. of plate form—the beam modifier may take a form commonly referred to as a phase plate) has an outer surface 6A that is profiled using conventional techniques such as laser etching, such that the thickness of the body varies across the aperture of beam $I_c$. The profile of the surface 6A is formed to modify the wavefront of $I_c$ such that the wavefront of $I_{ca}$ at any point about optical path of the ring resonator substantially matches the phase front of $I_a$.

In order to profile the surface 6A of the modifier 6, to provide the required modification of beam $I_c$ the wavefront of both clockwise beam $I_a$ and anticlockwise beam $I_a$ need to be measured.

The wavefront of $I_c$ is measured, with an interferometer, at or close to the position that the surface 6A of the modifier 6 will lie when the laser system 1 is in use. The source beam $I_{sa}$ of the interferometer arranged to coincide with $I_c$ to form a fringe pattern used to carry out this measurement is shown in FIG. 3.

The separation x between the measurement point (i.e. where the surface 6A will lie) and the coupling point into the resonator provided by the beam splitter 4 is identified. The wavefront of the portion of the beam $I_a$ coupled out of the resonator by the beam splitter 4 is similarly measured. The source beam $I_{sa}$ of the interferometer used to carry out this measurement is also illustrated in FIG. 3.

The distance y between the measurement point of the wave front of $I_a$ and the coupling point of $I_a$ provided by the beam splitter 4 out of the resonator is also identified.

Using the wavefront measurements of $I_a$ and $I_c$, a profile of the surface 6A is determined that will modify $I_c$ so that its wavefront after travelling a distance x+y following its transmission through the surface the second time matches, as much as possible, that of the measured wavefront of $I_c$. The various methods of carrying out such a determination will be familiar to those skilled in the art. The surface 6A of the modifier 6 is then profiled to the specification determined using conventional techniques such as, for example, laser etching, ion beam etching, chemical etching or photolithography.

With reference to FIG. 2, the laser system 1 further comprises a beam rectifier 7 that comprises a body (e.g. of plate form) that is transmissive to $I_a$ and $I_{ca}$. The beam rectifier 7 is arranged to rectify the wavefront of the combined beam following its coupling out of the resonator. The body defines a surface 7A profiled, using conventional techniques, so that the thickness of the body varies across the aperture of combined beam of $I_a$ and $I_{ca}$, to reduce the divergence, i.e. make more collimated, the laser system's output beam 1. If the surface 7A of the beam rectifier is to be separated from the output of the beam splitter by distance y then the same wavefront measurements of $I_a$ to profile the modifier surface 6A can be used to profile rectifier surface 7A.

In a variant arrangement, the beam rectifier 7 may be positioned within the resonator as illustrated by ghosted representation 7' in FIG. 2. Where this is so, the surface profiles 6A and 7A of the beam modifier 6 and beam rectifier 7 respectively will need to differ compared with when the beam rectifier is outside of the resonator to account for unintentional modification of the wavefront of $I_c$ by the beam rectifier as it circulates around the resonator.

It will be appreciated that the laser system 1 may be implemented using gain mediums other than Nd:YAG.

The optical path of the clockwise beam $I_c$ may be modified, possibly through provision of additional optical components, such that it only passes through modifier 6 once (or more than twice) between the beam splitter 4 and the further reflector 5.

The beam rectifier 7 may take other forms. For example it may be provided by a reflective surface and this may, for example, be implemented where one or more of the reflectors 3 take the form of a mirror, through profiling one or more of the reflectors' reflective surfaces.

The resonator may comprise a Q-switch in addition to the laser gain medium.

Variant ring resonator designs can incorporate components such as corner cubes and folding prisms instead of mirrors, as well as components with focal power e.g. lenses, or curved mirrors.

It is preferred that reflector 5 is used in order that the first beam is reintroduced into the resonator at substantially the same point that it is ejected. This is preferably achieved by using the same beamsplitter 4 to both eject and reintroduce the first beam. However in a variant, different beam splitters may be used to respectively eject and reintroduce the beam. In another, those probably less preferred variant, it may be possible to dispense with the reflector 5 and instead use an additional beam splitter to reintroduce the first beam into the ring at a different point (e.g. directly opposite the first beam splitter) 4 in the resonator.

The invention claimed is:

1. A laser system comprising:
   an optical ring resonator;
   a gain medium configured and arranged to output:
      a first beam that will circulate around the optical ring resonator in a first direction, and
      a second beam that will circulate around the optical ring resonator in a second direction, the second direction being opposite to the first direction;
      redirector apparatus configured to direct the first beam out from the optical ring resonator and reintroduce the coupled out first beam back into the resonator as a redirected first beam such that the redirected first beam travels in the second direction around the ring resonator; and
   a beam modifier configured and adapted to modify a spatial distribution of phase across an aperture of the coupled out first beam, such as to cause the spatial distribution of phase across the aperture of the coupled out first beam to approach a profile or substantially match a spatial distribution of phase across an aperture of the second beam, wherein the beam modifier only interacts with the coupled out first beam.

2. A laser system according to claim 1, wherein the beam modifier comprises:
   a surface upon which the first beam is incident, the surface being profiled to modify a wavefront of the first beam such that the spatial distribution of phase across the aperture of the first beam will approach the profile or substantially match the spatial distribution of phase across the aperture of the second beam.

3. A laser system according to claim 2, wherein the redirector apparatus comprises:
a beam splitter that directs at least a portion of the first beam out of the resonator towards a reflector that reflects the portion of the first beam back into the optical ring resonator.

4. A laser system according to claim 3, wherein the beam modifier is configured to be transmissive to the first beam and arranged between the beam splitter and the reflector.

5. A laser system according to claim 3, wherein a reflecting surface of the reflector is profiled to modify the wavefront of the portion of first beam such that the spatial distribution of phase across the aperture of the first beam will approach the profile or substantially match the spatial distribution of phase across the aperture of the second beam.

6. A laser system according to claim 5, wherein the beam splitter is configured to output a portion of the second beam and the re-directed first beam from the optical ring resonator.

7. A laser system according to claim 6, comprising:
a wavefront distortion rectifier configured and adapted to rectify wavefronts of both the second beam and the redirected modified first beam to correct wavefront aberrations of said second beam and redirected modified first beam.

8. A laser system according claim 7, wherein the wavefront distortion rectifier is arranged to rectify the wavefronts of the second beam and redirected first beam following output from the optical ring resonator.

9. A laser system according to claim 7, wherein the wavefront distortion rectifier is configured and arranged intra-cavity within the optical ring resonator.

10. A laser system according to claim 8, wherein the wavefront distortion rectifier comprises:
a body that is configured to be transmissive to the first beam and the second beam, the body having an outer surface profiled such that the body has a thickness that varies across the apertures of the first and second beams.

11. A laser system comprising:
an optical ring resonator and a wavefront distortion rectifier, the wavefront distortion rectifier being configured and adapted to modify a wavefront of an optical beam incident thereon to correct wavefront aberration of said optical beam, wherein the wavefront distortion rectifier only interacts with one optical beam of the optical ring resonator, and wherein the wavefront distortion rectifier is:
arranged intra-cavity within the optical ring resonator to modify a wavefront of an optical beam within the optical ring resonator,
configured and arranged to correct wavefront aberration of a first optical beam travelling in a first direction around the optical ring resonator, and
configured and adapted to modify the wavefront of an optical beam transmitted through the wavefront distortion rectifier.

12. A laser system resonator according to claim 11, wherein the wavefront distortion rectifier comprises:
a surface profiled to modify the wavefront of the optical beam incident on said surface.

13. A method of operating a laser, the method comprising:
(a) providing an optical ring resonator;
(b) activating a gain medium in order to cause it to output:
a first beam that circulates around the optical ring resonator in a first direction, and
a second beam that circulates around the optical ring resonator in a second direction, the second direction being opposite to the first direction;
(c) directing at least a portion of the first beam out from the optical ring resonator;
(d) reintroducing the at least a portion of the first beam back into the resonator such that it travels in the second direction around the ring resonator; and
(e) modifying a spatial distribution of phase across an aperture of at least the portion of the first beam coupled out of the optical ring resonator, such as to cause the spatial distribution of phase across an aperture of at least the portion of the first beam coupled out of the optical ring resonator to approach a profile or substantially match that of a spatial distribution of phase across an aperture of the second beam,
wherein steps (c) to (e) apply only to the first beam.

14. A laser system according to claim 3, wherein the beam splitter is configured to output a portion of the second beam and the re-directed first beam from the optical ring resonator.

15. A laser system according to claim 4, wherein the beam splitter is configured to output a portion of the second beam and the re-directed first beam from the optical ring resonator.

16. A laser system according to claim 1, comprising:
a wavefront distortion rectifier configured and adapted to rectify wavefronts of both the second beam and the redirected modified first beam to correct wavefront aberrations of said second beam and redirected modified first beam.

* * * * *